(No Model.)

A. C. KASSON.
WAGON AXLE BEARING.

No. 260,875. Patented July 11, 1882.

Witnesses:

Inventor:
Amasa C. Kasson
By C. H. Bottum
Attorney.

UNITED STATES PATENT OFFICE.

AMASA C. KASSON, OF MILWAUKEE, WISCONSIN.

WAGON-AXLE BEARING.

SPECIFICATION forming part of Letters Patent No. 260,875, dated July 11, 1882.

Application filed October 17, 1881. (No model.)

*To all whom it may concern:*

Be it known that I, AMASA C. KASSON, of Milwaukee, in the county of Milwaukee and State of Wisconsin, have invented certain new and useful Improvements in Wagon-Axle Bearings; and I do hereby declare that the following is a full, clear, and exact description of the invention, which will enable others skilled in the art to which it pertains to make and use the same, reference being had to the accompanying drawings, and to the letters of reference marked thereon, which form a part of this specification.

My invention relates to the axle bearings and boxes of carriages and vehicles of all descriptions; and it consists in constructing the same in a novel and improved manner of constructing the axle bearing and boxes, so as to prevent lost motion or end shaking, and also provide proper means of take-up to compensate for wear of the parts.

Figure 1:
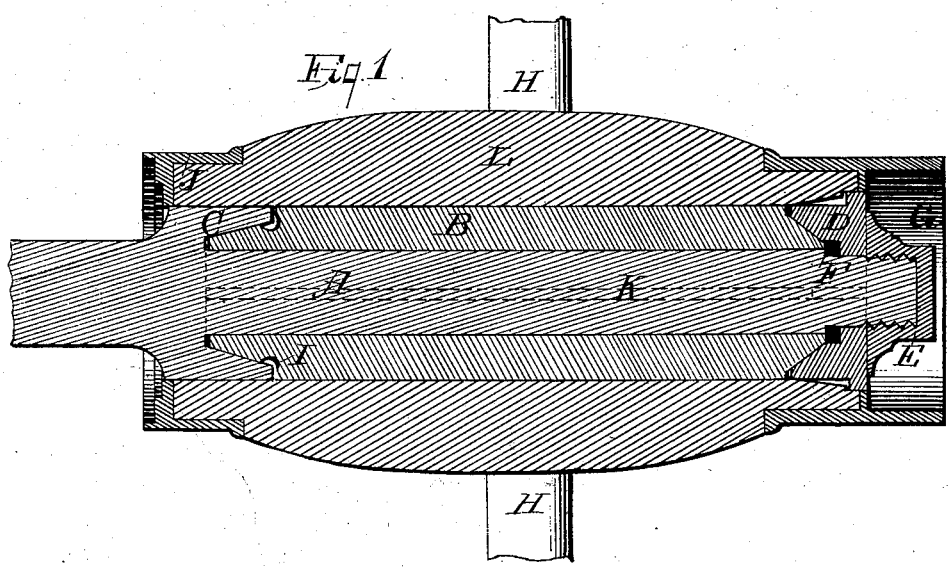
Figure 2:
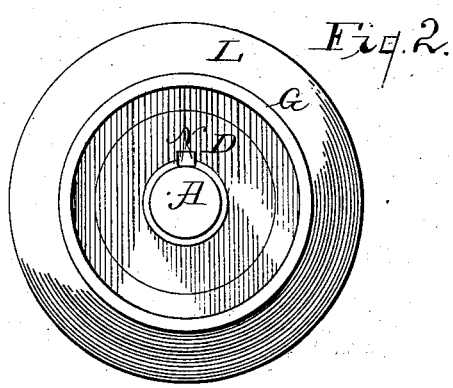

In the accompanying drawings like letters refer to similar parts throughout, and in the same Figure 1 is a vertical medial section of the axle bearing box and hub, taken longitudinally; and Fig. 2 is a front view of a cap or washer placed next to the wheel underneath the nut which retains the wheel in place.

H H are the wheel-spokes, L is the hub, and J G are the bands which are usually placed on the ends of the hub. B is the iron box placed inside the hub to form a metallic bearing, and which is provided with conically-shaped ends, as shown in Fig. 1, and with an annular oil well or groove, I. This oil-groove I is usually placed at both ends of the box; but the construction shown in the delineation of the front end of the box may be adopted without departing from the spirit of my invention.

The shoulder of the axle is provided with a conical annular projection, C, to fit the box, shaped as described, and a washer similarly shaped, D, is placed on the axle in front of the wheel. This washer D is secured in place by the nut G, attached in the usual way. Between the washer D and the box B, I usually insert a ring-washer, F, which by being made to vary in thickness acts as a take-up when wear is to be compensated. It may be made of leather or brass or any suitable material, and should be maintained of such thickness as to cause all end strain and wear to come upon the conical bearings. Through the length of the bearing a slot like a keyway, K, is cut to form an oil reservoir or feeder, and a small pin or key is attached to the washer D, so as to keep it from turning with the wheel, and thereby turn the nut off. When the cone-bearings are worn so as to cause the wheel to rattle a thicker wear-washer F is substituted. In this manner all rattling and lost motion are prevented, and a steady, uniform bearing is secured, which does not rattle, and has the smoothness and freedom from friction which accompanies the cone-bearing. All end shaking is taken up by the cones, and there are no square bearings to cause any rattling.

In making my device care should be taken to leave sufficient space between the ends of the cones, washer, and box, and the shoulders of the axle, so that as the conical surfaces wear the washer can be moved up and keep the cone-surfaces still in close contact.

I claim—

1. In a wagon-axle bearing, the combination of the box B, provided with the two conically-shaped bearings at the ends, the axle A, provided with the interior cone, C, and the conically-shaped washer D, all constructed and operating substantially as and for the purposes set forth.

2. In a wagon-axle bearing, the combination of the axle A, provided with the conically-shaped shoulder C, the box B, provided with two conically-shaped bearings at the ends, annular oil-groove I, and oil-reservoir K, conically-shaped washer D, and nut G, substantially as and for the purpose set forth.

In testimony that I claim the foregoing as my own I affix my signature in presence of two witnesses.

AMASA C. KASSON.

Witnesses:
E. H. BOTTUM,
F. H. BOTTUM.